United States Patent [19]

Twigg

[11] Patent Number: 5,227,954
[45] Date of Patent: Jul. 13, 1993

[54] ARRANGEMENT FOR MOUNTING DISK DRIVE IN DRIVE DOCK

[75] Inventor: Robert E. Twigg, Hillsboro, Oreg.

[73] Assignee: Epson Portland, Inc., Hillsboro, Oreg.

[21] Appl. No.: 781,042

[22] Filed: Oct. 18, 1991

[51] Int. Cl.5 .......................... H05K 7/14; H05K 7/18; H02B 1/01; A47B 88/04
[52] U.S. Cl. .................................. 361/391; 361/429; 312/242; 312/334.7
[58] Field of Search ...................... 211/26, 41, 94, 162; 248/27.1, 27.3, 201, 906; 312/242, 330.1, 334.7, 334.16, 334.21; 361/338, 342, 390, 391, 412, 415, 429

[56] References Cited

U.S. PATENT DOCUMENTS

| | | | |
|---|---|---|---|
| 3,099,501 | 7/1963 | Hillson et al. | 312/334.21 X |
| 3,470,420 | 9/1969 | Marks | 439/377 X |
| 3,915,307 | 10/1975 | Agarde | 211/41 |
| 4,019,099 | 4/1977 | Calabro | 211/41 X |
| 4,310,870 | 1/1982 | Kia et al. | 361/415 |
| 4,447,030 | 5/1984 | Nattel | 248/27.1 |
| 4,478,464 | 10/1984 | Williams | 312/242 X |
| 4,491,981 | 1/1985 | Weller et al. | 361/391 X |
| 4,589,794 | 5/1986 | Sugiura et al. | 439/377 X |
| 4,748,539 | 5/1988 | Fukuyama | 361/415 X |
| 4,866,576 | 9/1989 | Umetsu et al. | 361/429 |
| 4,964,017 | 10/1990 | Jendrick et al. | 361/390 |
| 5,033,627 | 7/1991 | Brown | 211/26 X |
| 5,048,698 | 9/1981 | Konrad | 211/94 X |
| 5,053,925 | 10/1991 | Kitajima | 361/391 |
| 5,098,175 | 3/1992 | Cooke et al. | 312/341.1 |

FOREIGN PATENT DOCUMENTS

| | | | |
|---|---|---|---|
| 1215788 | 5/1966 | Fed. Rep. of Germany | 312/330.1 |
| 3005274 | 8/1981 | Fed. Rep. of Germany | 361/391 |
| 2067389 | 7/1981 | United Kingdom | 312/334.7 |

Primary Examiner—Leo P. Picard
Assistant Examiner—Michael W. Phillips
Attorney, Agent, or Firm—Skjerven, Morrill, MacPherson, Franklin & Friel

[57] ABSTRACT

Mounting plates are described for mounting one or more disk drives in a computer drive dock. Each mounting plate has a number of tracks each formed by a pair of ridges. The track width is greater at the ends than in the central region. Screws are threaded into the standard mounting holes tapped in the sides of the disk drive. These screws also hold brackets to the sides of the disk drive. Two of the mounting plates are attached opposite each other on the inside walls of the drive dock, and the heads of the screws are slid into the tracks. The brackets have wings which are attached to the front of the drive dock to hold the disk drive in place. One of the tracks is designed to accommodate all three sizes of so-called "third-high" drives. A unique structure for attaching the mounting plates to the side walls of the drive dock without threaded fasteners is also disclosed.

20 Claims, 13 Drawing Sheets

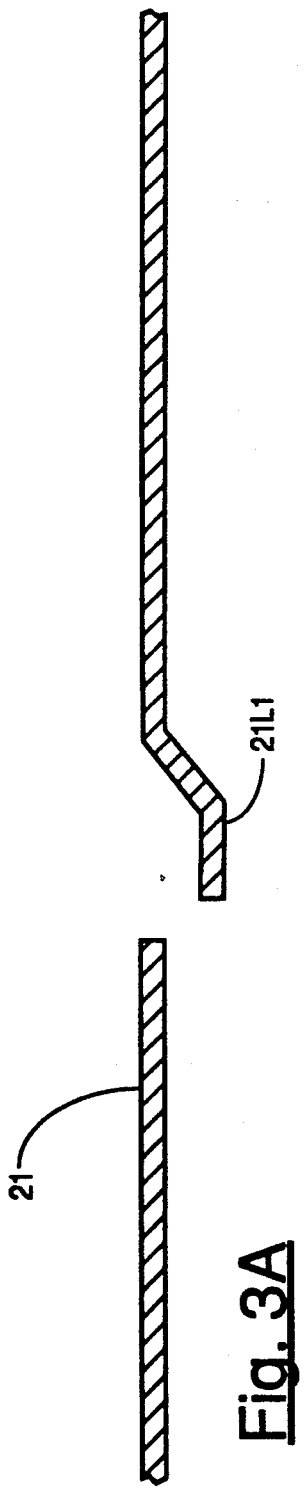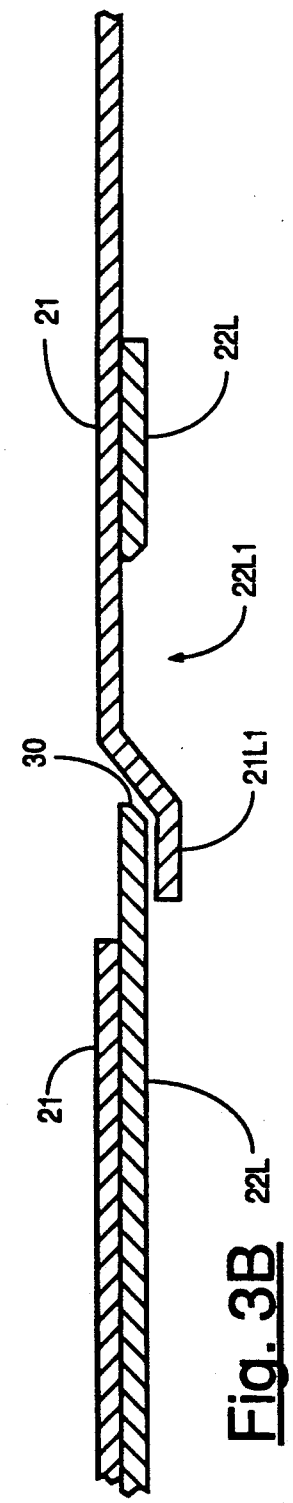

1

ARRANGEMENT FOR MOUNTING DISK DRIVE IN DRIVE DOCK

FIELD OF THE INVENTION

This invention relates to desktop computers, and in particular to an arrangement for mounting disk drives in a desktop computer.

BACKGROUND OF THE INVENTION

Desktop computers normally contain a metal housing, sometimes referred to as a "drive dock", in which the disk drives which serve the computer are mounted. The drives themselves come in a number of standard sizes, which are defined by the vertical dimension of the drive. These sizes include: 86 mm, 42 mm, 28 mm, 27 mm and 25.4 mm. The 86 mm size is sometimes referred to as "full-high", the 42 mm size is "half-high", and the 28 mm, 27 mm, and 25.4 mm sizes as "third-high".

Disk drives are mounted in several ways. The simplest way is simply to form holes in the sides of the drive dock and insert metal screws through these holes into threaded holes which are tapped into the sides of the disk drive. These latter holes are formed in pairs on either side of the disk drive, and they are positioned at locations which are standardized in the industry. A disadvantage of this method is that, because of the close proximity of other components inside the computer, the entire drive dock normally must be removed in order to loosen the mounting screws and remove or change the disk drives. Moreover, since the screw holes tapped in the sides of the disk drive are not spaced at a uniform distance from the front of the drive on the different sizes, the front faces of the drives may not line up properly if they are mounted in this manner.

Moreover, previous mounting arrangements are generally limited in their ability to accommodate disk drives of more than one size, including the three different sizes in the "third-high" category.

Accordingly, it would be very useful to provide a mounting arrangement which allows drives of different sizes to be mounted in a drive dock, which allows the drives to be removed from the drive dock without removing the latter from the computer, and which assures that the faces of a plurality of drives are lined up properly when mounted in the drive dock.

SUMMARY OF THE INVENTION

The mounting arrangement of this invention includes two mounting plates, which are preferably made of plastic. The mounting plates are attached to the insides of the side wall of a drive dock. In each plate a plurality of horizontal tracks are formed. At least one of the tracks is designed to accommodate an 86 mm disk drive; at least two of the tracks are designed to accommodate at least two 42 mm disk drives, and at least one of the tracks is designed to accommodate a 28 mm, 27 mm or 25.4 mm disk drive.

The disk drives slide into the tracks on the heads of mounting screws which are inserted into the standard mounting holes on the sides of each disk drive.

The mounting screws are also used to mount a bracket on each side of the disk drive. The bracket has a section which can be attached to a fastening means at the front of the drive dock, thereby allowing the drive to be removed from the dock without removing the latter from the computer. In a preferred embodiment, this section consists of a right-angle section which fits over a threaded stud protruding from the front of the drive dock. A nut is threaded onto the stud to secure the drive in place.

The mounting screws fit through horizontal slots in the brackets, thereby permitting the disk drive to be adjusted from front to back so that the faces of all drives line up properly. The slots also permit some vertical adjustment to allow the 28 mm, 27 mm and 25.4 mm drives to be mounted in a single track.

In a preferred embodiment, the mounting plates can be snapped into place on the inside walls of the drive dock without the use of screw fasteners. A single form of plate is useable on both the left and right sides of the drive dock.

DESCRIPTION OF THE DRAWINGS

FIGS. 3A and 3B are cross-sectional views of the hooks used in attaching a mounting plate to a side wall of a drive dock.

DESCRIPTION OF THE INVENTION

As the industry has evolved, computer disk drives are manufactured in several different size categories, which are identified by the height (vertical dimension) of the drive. The largest drives have a height of 86 mm and are known as "full-high" drives. Drives having a height of 42 mm are classified as "half-high" drives. Drives having a height of 28 mm, 27 mm or 25.4 mm are included in a single category known as "third-high" drives. All of these drives are manufactured with a pair of mounting holes tapped on either side, and the locations of these mounting holes has likewise become standardized. FIGS. 1A-1E are side views showing the locations of the mounting holes on full-high, half-high, and third-high drives (28 mm, 27 mm and 25.4 mm), respectively (all dimensions are in inches).

Figure 1A:
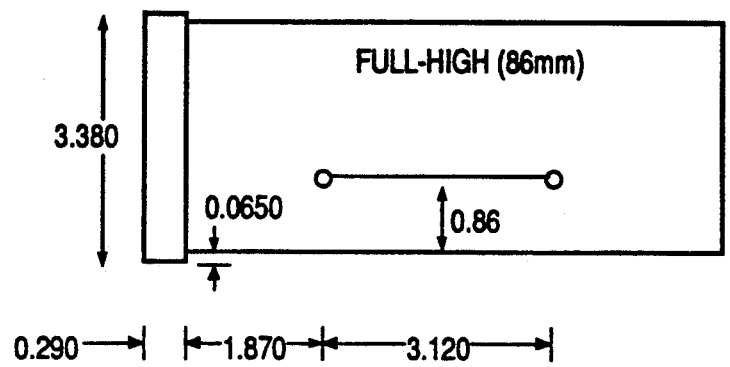
FIGS. 1A-1E are side views of full-high, half-high and third-high disk drives, showing the standard locations of the mounting holes.
Figure 1B:
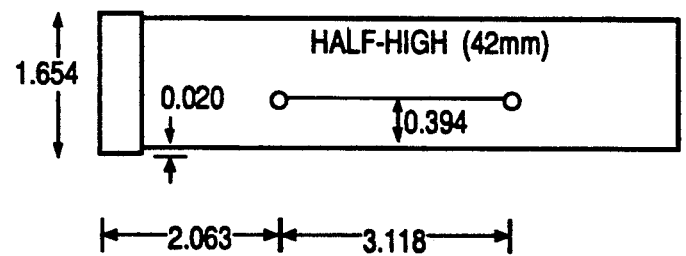
Figure 1C:
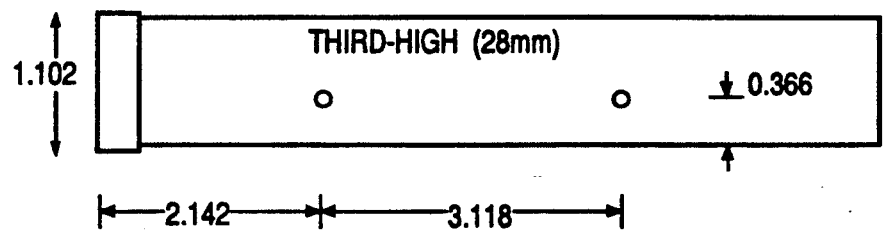
Figure 1D:
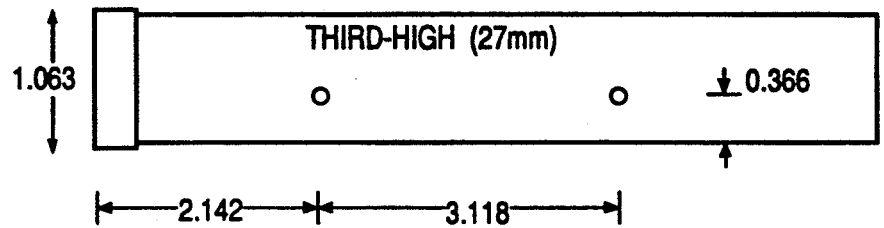
Figure 1E:
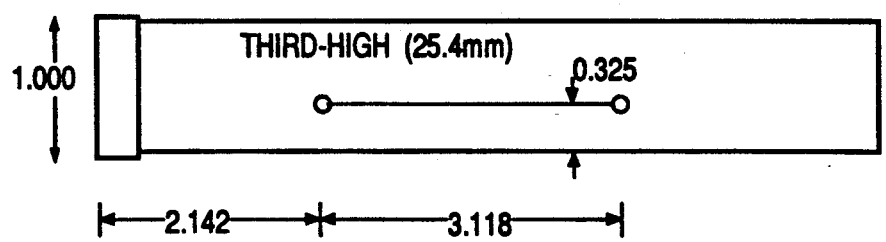
Figure 2:
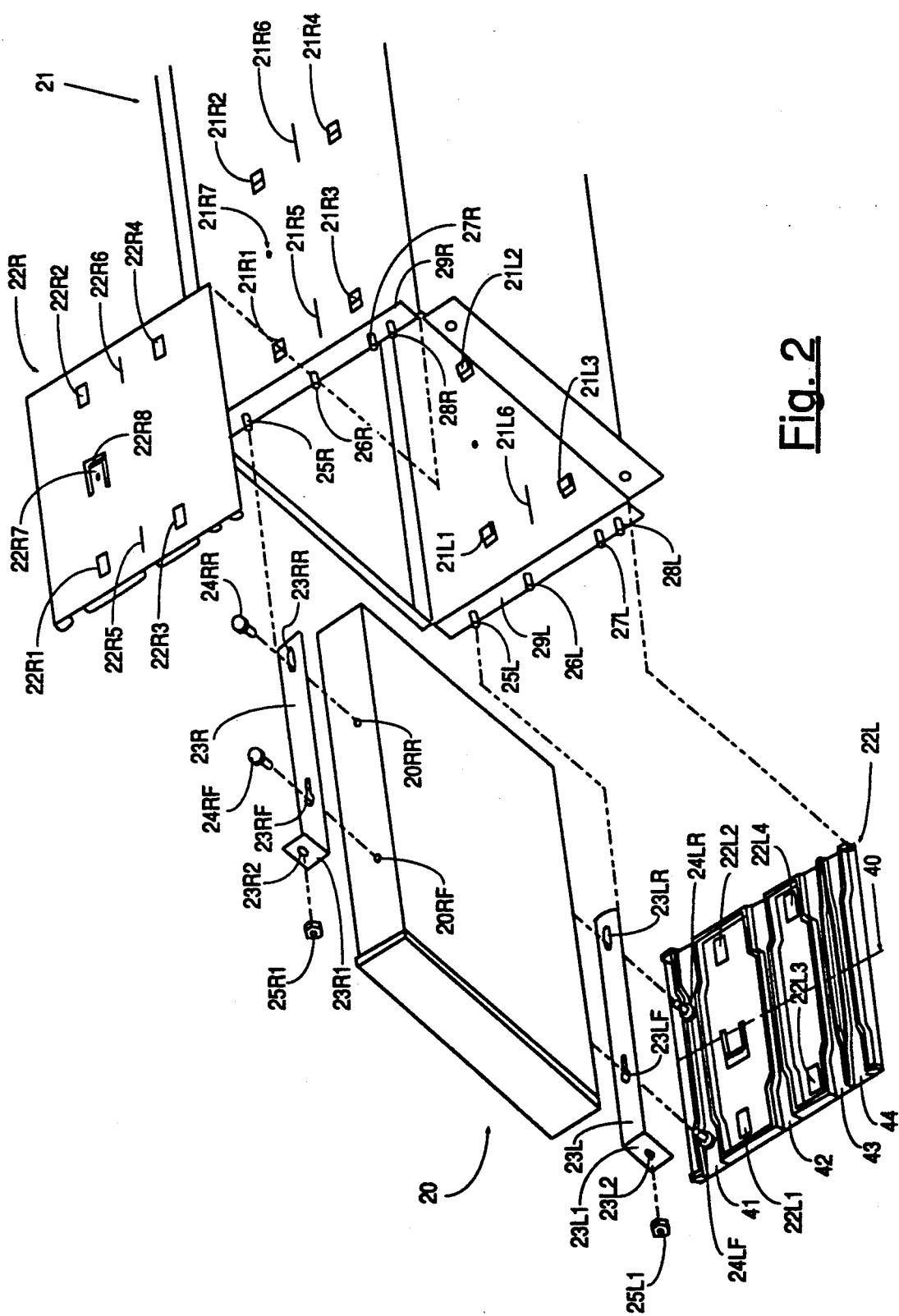
FIG. 2 is an exploded view showing the mounting of a disk drive in accordance with this invention.

FIG. 2 is an exploded view showing how a disk drive 20 is mounted in a drive dock 21 by means of a left mounting plate 22L and right mounting plate 22R, respectively. Mounting plates 22L and 22R are identical and are formed of plastic in this embodiment.

Viewing the backside of mounting plate 22R in FIG. 2, several features are apparent. First, plate 22R contains four rectangular windows 22R1, 22R2, 22R3 and 22R4. Windows 22R1-22R4 are sized so that hooks 21R1-21R4 formed in the right side of drive dock 21 can fit through them. The details of this structure are illustrated in FIGS. 3A and 3B, discussed below. Corresponding windows 2L1-22L4 in mounting plate 22L and hooks 21L1-21L4 in the left side of drive dock 21 are also shown in FIG. 2. Using the mounting plate 22L as an example, it is mounted by placing it against the side of drive dock 21, with each of hooks 21L1-21L4 extending into a corresponding one of windows 22L1-22L4. Mounting plate 22L is then pushed backward until each of hooks 21L1-21L4 fully engages mounting plate 22L.

This structure is illustrated more fully in FIGS. A and 3B, which are cross-sectional views of hook 21L1 alone and after it has engaged an edge of window 22L1, respectively. As is shown in FIG. 3B, the edge of window 22L1 has a canted surface 30. In the position shown in FIG. 3B, mounting plate 22L is pressed against a side of drive dock 21.

Referring again to FIG. 2, mounting plate 22R has ridges 22R5 and 22R6 formed on its backside. Ridges 22R5 and 22R6 are positioned and sized so as to fit into slots 21R5 and 21R6 in the side of drive dock 21 and thereby vertically position mounting plate 22R with respect to drive dock 21. Slots 21R5 and 21R6 are longer than ridges 22R5 and 22R6 so that the latter may fit into the former while mounting plate 22R is pushed backward to engage hooks 21R1-21R4 and windows 22R1-22R4. To position mounting plate 22R horizontally and to lock it in position, a hemispherical protuberance 22R7 is formed on a tab 22R8. Protuberance 22R7 is raised above the surface of mounting plate 22R, and thus tab 22R8 bends slightly while mounting plate 22R is being installed. The position of protuberance 22R7 coincides with a small hole 21R7 which is formed in the side wall of drive dock 21. When mounting plate 22R is fully installed, protuberance 22R7 projects into hole 21R7 and locks mounting plate 22R securely in place. As noted above, mounting plates 22L and 22R are identical. Thus, all of the elements described above on mounting plate 22R are duplicated on mounting plate 22L. The only difference is that, when mounting plate 22L is installed tab 22L8 faces backward rather than forward (compare the orientation of tabs 22R8 and 22L8 in FIG. 2).

Brackets 23R and 23L are mounted on the right and left sides, respectively, of disk drive 20. Bracket 23R is mounted with a front screw 24RF and a rear screw 24RR. Screws 24RF and 24RR are inserted through slots 23RF and 23RR in bracket 23R and ar threaded into holes 20RF and 20RR, which are in the standard positions on disk drive 20. In a similar manner, bracket 23L is mounted with screws 24LF and 24LR which fit through slots 23LF and 23LR and are threaded into holes 20LF and 20LR (not shown) in disk drive 20. Slots 23RF and 23LF are formed in the shape of a keyhole (see FIGS. 6A and 6B).

Brackets 23R and 23L have right-angle wings 23R1 and 23L1 which contain slots 23R2 and 23L2, respectively. Slots 23R2 and 23L2 fit over threaded studs 25L and 25R which extend from flanges 29L and 29R of drive dock 21. Kep nuts 25R1 and 25L1 are threaded onto studs 25R and 25L, respectively, to secure brackets 23R and 23L in place (A "kep nut" is a hexagonal nut having a captivated external star washer.).

Figure 4:
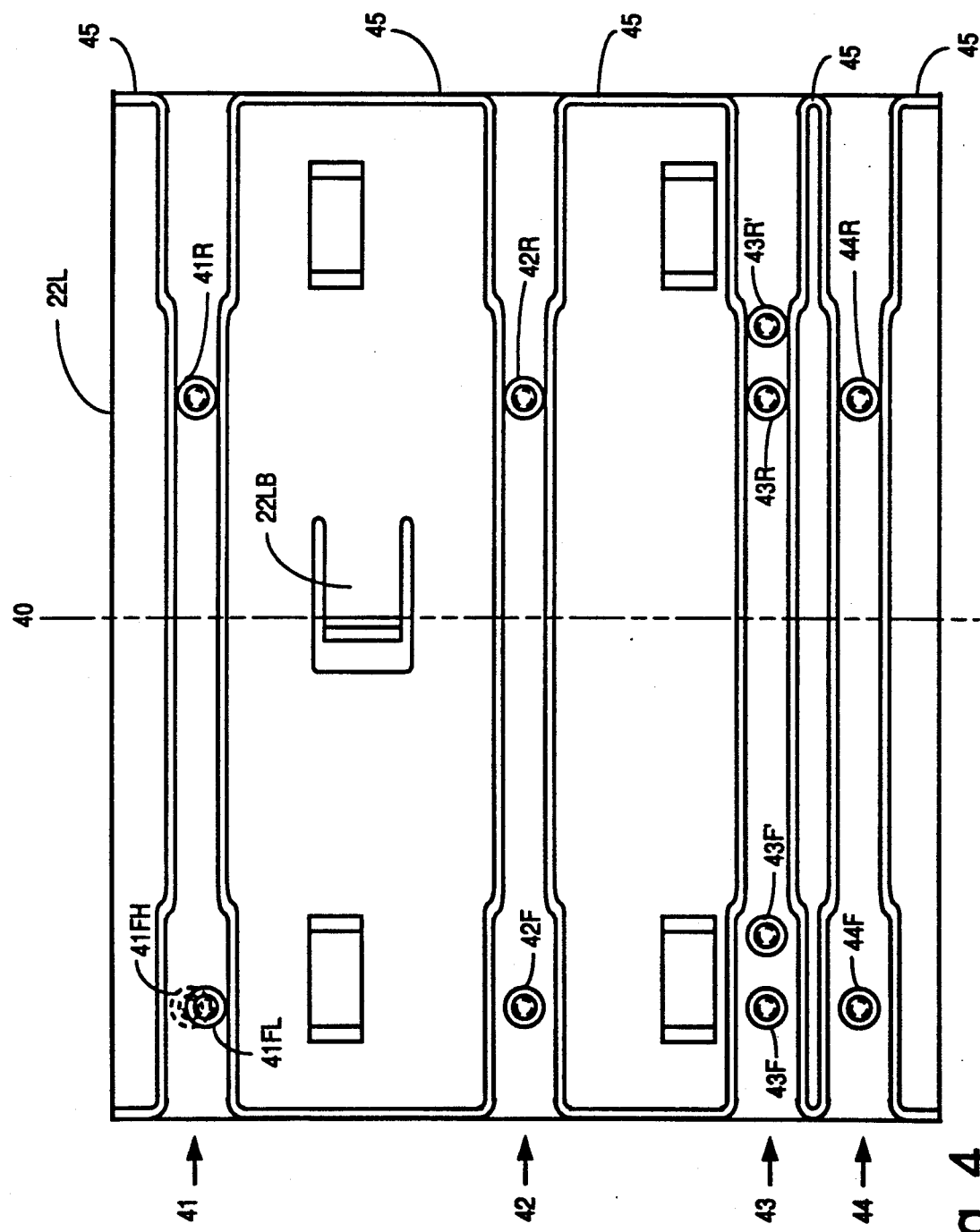
FIG. 4 is a plan view of a mounting plate, showing the locations of the mounting tracks and the screw heads which slide into the mounting tracks.

FIG. 4 shows the inside face of mounting plate 22L which, except for tab 22L8, is symmetrical about centerline 40. Guide tracks 41, 42, 43 and 44 are formed as respective channels between ridges 45 which extend from the flat surface of mounting plate 22L. Ridges 45 are high enough to permit them to engage the heads of screws 24RF and 24RR and screws 24LF and 24LR, which are Filister head screws, and thereby support disk drive 21.

As shown in FIG. 4, each of guide tracks 41-44 is divided into three sections: a relatively narrow central section and two relatively wide end sections. The central sections should have a width which is slightly greater than the head diameters of screws 24RF, 24RR, 24LF and 24LR. The width of the end sections is slightly greater, to allow some vertical adjustment of the front screws (24RF, 24LF) and to make it easier to guide the mounting screws into the tracks. In the embodiment of FIG. 4, the central sections are 0.230 inches wide and the end sections are 0.310 inches wide.

Figure 5A:
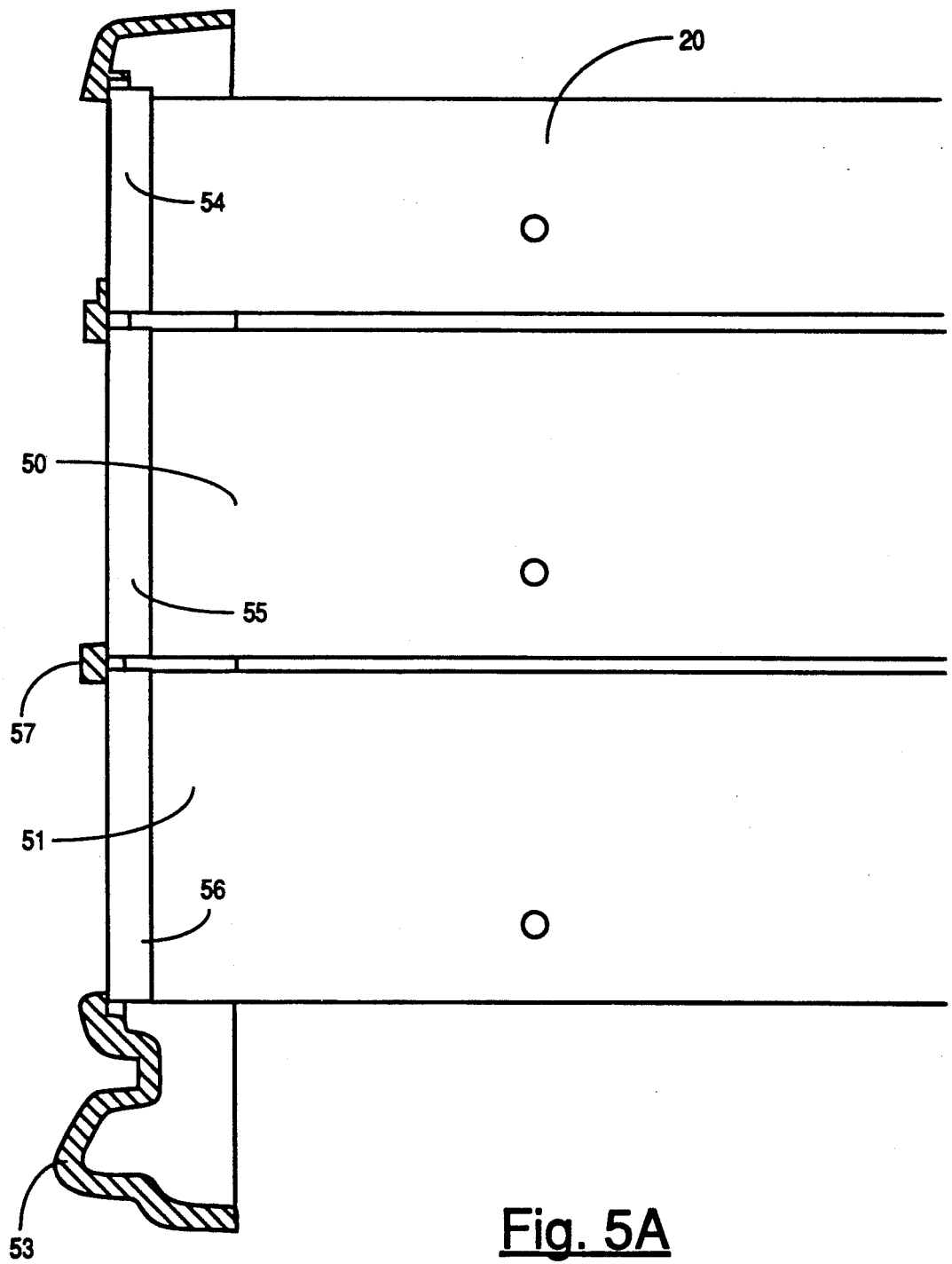
FIGS. 5A and 5B illustrate the mounting of two half-high drives and one third-high drive, and one full-high drive and one-third high drive, respectively.
Figure 5B:
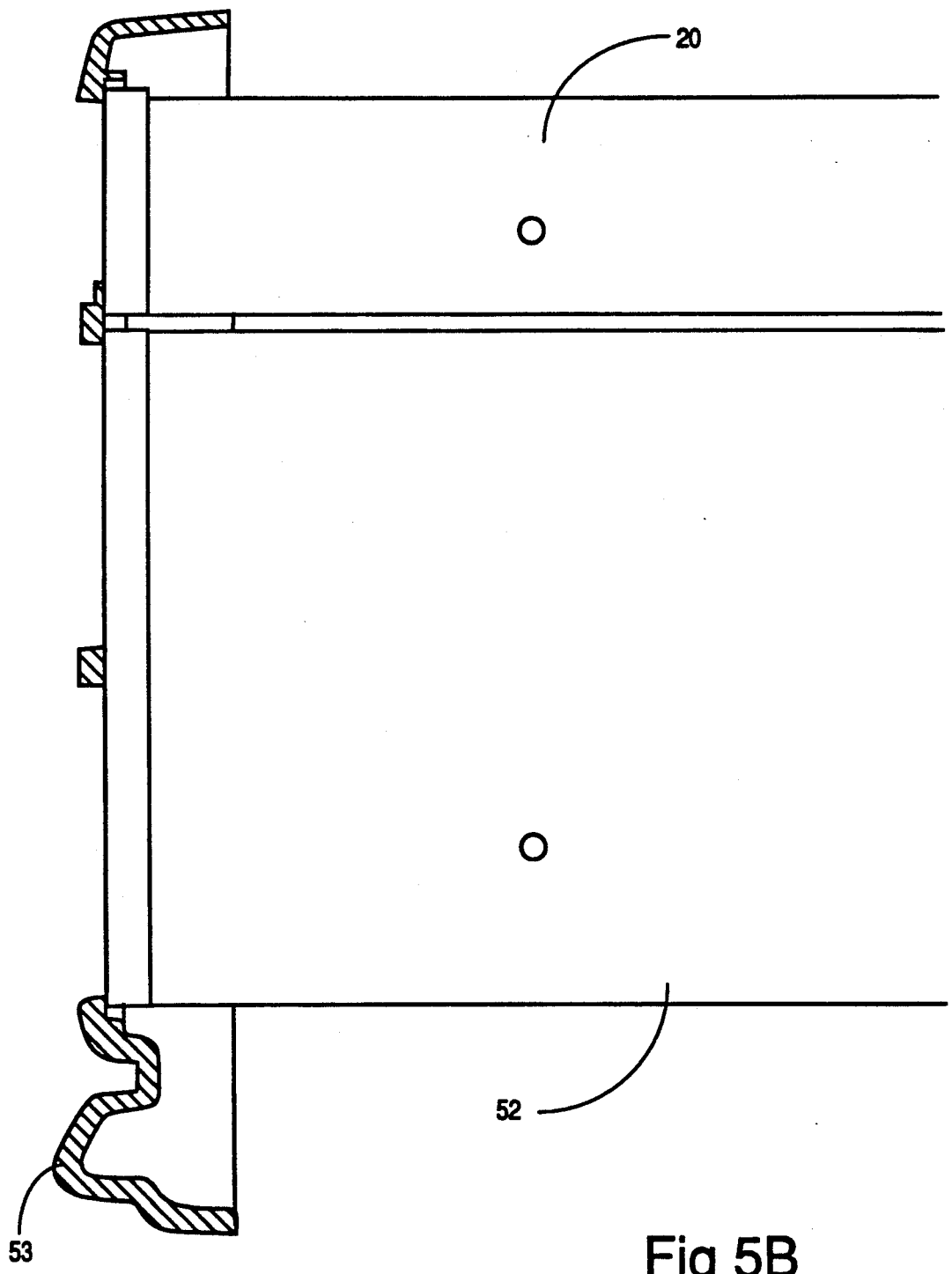

As shown in FIG. 2, the screws used to mount brackets 23R and 23L slide into track 41 when disk drive 20 is mounted. Track 41 is used to mount third-high drives, and accordingly disk drive 20 is a third-high drive. Tracks 42 and 44 are used to mount half-high drives, simultaneously, and track 43 is used to mount a full-high drive. The configurations of these drives as mounted are shown in FIG. 5A, which shows third-high drive 20 and two half-high drives 50 and 51, and FIG. 5B which shows third-high drive 20 and a single full-high drive 52.

Tracks 41-44 must be spaced properly so as to receive the heads of the screws used to mount the brackets on the sides of each size of disk drive. It has been found that track 43 should be 0.466 inches above track 44; track 42 should be 1.247 inches above track 43; and track 41 should be 1.701 inches above track 42. Threaded studs 26L and 26R, 27L and 27R, and 28L and 28R extend from flanges 29L and 29R (see FIG. 2) and are positioned so as to receive the mounting brackets attached to disk drives mounted in tracks 42, 43 and 44, respectively. Here again, proper positioning is important. In this embodiment, the separation between studs 27R and 28R is 0.456 inches, the separation between studs 26R and 27R is 1.227 inches, and the separation between studs 25R and 26R is 1.701 inches. The corresponding studs 25L-28L on flange 29L are similarly spaced.

FIG. 4 shows schematically the locations of the side mounting screw heads when the disk drives have been installed in drive dock 21. Heads 44F and 44R designate the positions of the front and rear screw of a half-high drive mounted in track 44. Heads 43F and 43R designate the positions of the screw heads in a full-high drive mounted in track 43. Heads 42F and 42R designate the positions of the front and rear screw heads in a half-high drive mounted in track 42. In each instance, it will be noted that the rear screws 42R-44R rest on the bottom of the track while the front screws 42F-44F are suspended in the track. This arises from the fact that the front portions of the disk drives are supported by studs 26L and 26R, 27L and 27R, and 28L and 28R on the flanges 29L and 29R of drive dock 21.

Figure 4A:
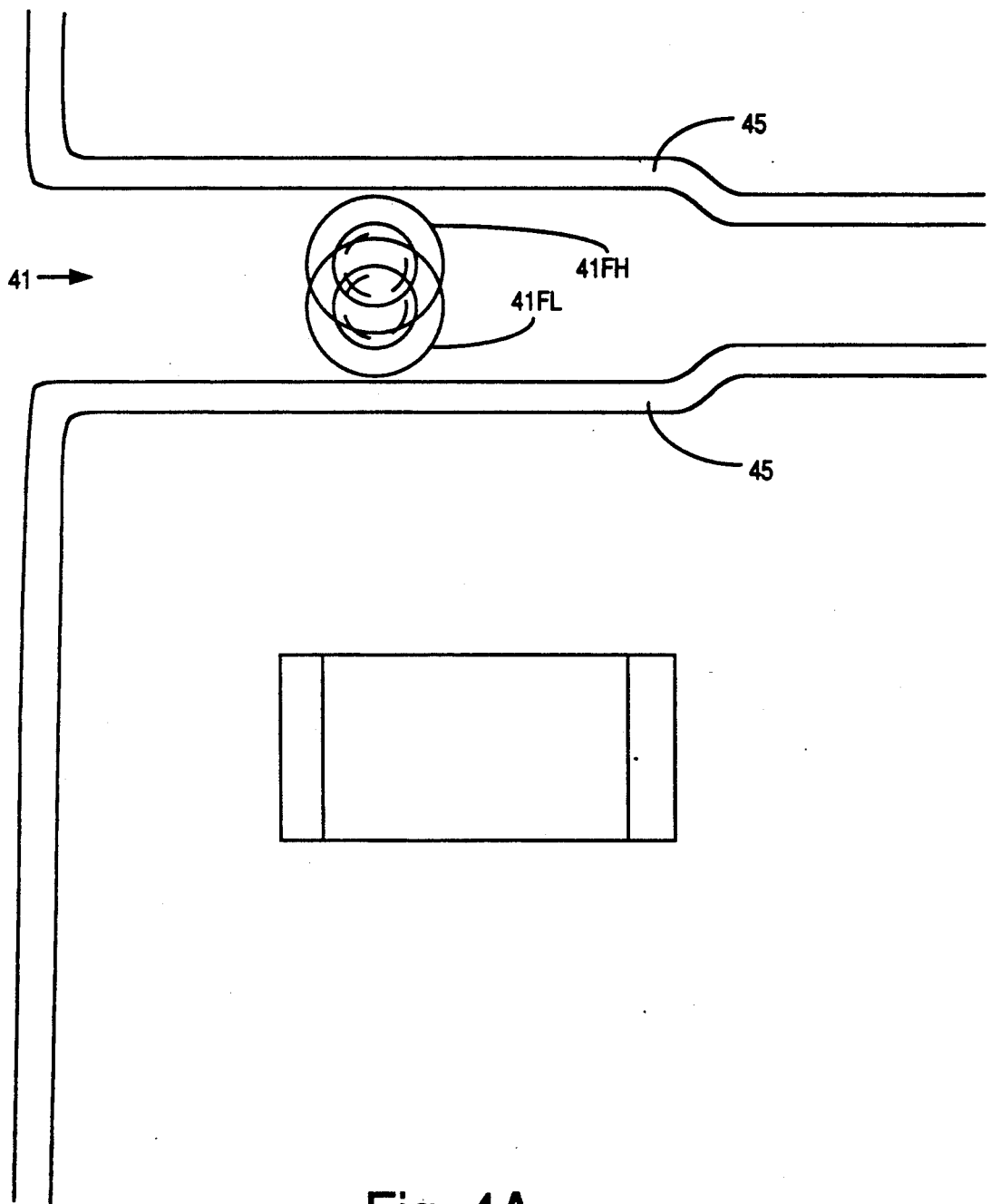
FIG. 4A illustrates a portion of FIG. 4 in detail.

FIG. 4 indicates two head positions 41FH and 41FL for the front mounting screw in guide track 41 (FIG. 4A is a detailed view of head positions 41FH and 41FL). This reflects the fact that there are three different sizes of third-high drives: 24.5 mm, 27 mm and 28 mm. When a 24.5 mm drive is mounted in track 41, the front mounting screw head is at position 41FH, and when a 28 mm drive is mounted in track 41 the front screw head is at position 41FL. With a 27 mm drive, the front screw head would be located between 41FH and 41FL. In all cases, the rear screw is at position 41R.

Depending on the circumstances, the positions of the disk drives in tracks 41-44 may be adjusted horizontally, provided that the rear screws 41R-44R remain in the relatively narrow central sections of tracks 41-44 (see screw heads 43F' and 43R'). For example, a hard disk drive which does not require access from the front may be pushed further back in the drive dock to allow it to be covered by a decorative panel in the computer housing.

Figure 6A:
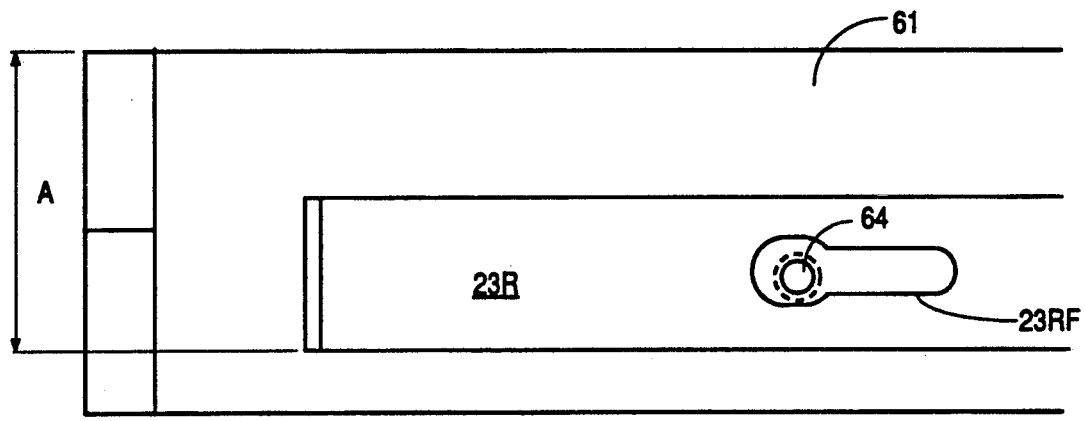
FIGS. 6A and 6B are detailed views showing the mounting of the side brackets on 25.4 mm and 28 mm drives, respectively.
Figure 6B:
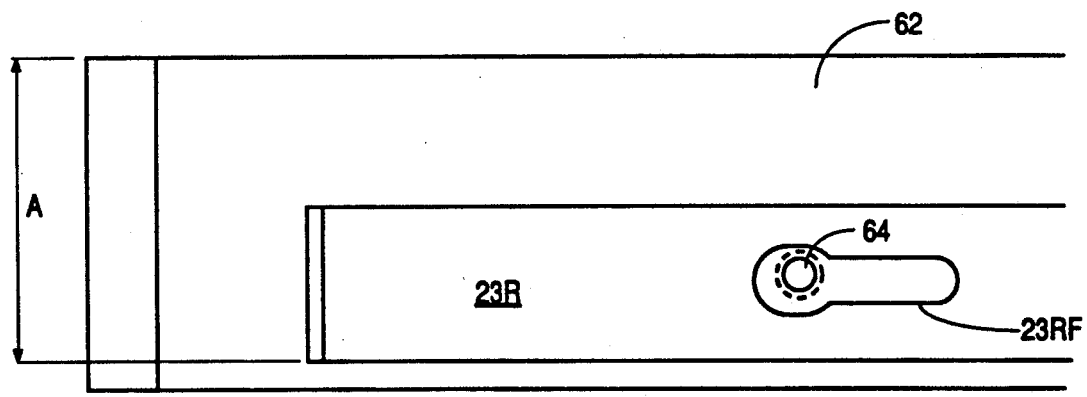

As shown in FIGS. 6A and 6B, the side brackets are mounted at a uniform distance from the top surface of third-high drives. FIG. 6A shows the position of side bracket 23R on a 28 mm drive 61. FIG. 6B shows the position of side bracket 23R on a 25.4 mm drive 62. In each case the distance A between the bottom of bracket 23R and the top of disk drive 61 or 62 is the same. In this embodiment, the distance A is 24 mm.

Bracket 23R has keyhole-shaped slot 23RF for the front mounting screw, the shaft of which is denoted in cross-section by a circle 64. It will be noted that in mounting the 28 mm drive 61 of FIG. 6A, shaft 64 is lower in slot 63 than it is in mounting the 25.4 mm drive 62 of FIG. 6B.

Figure 7:
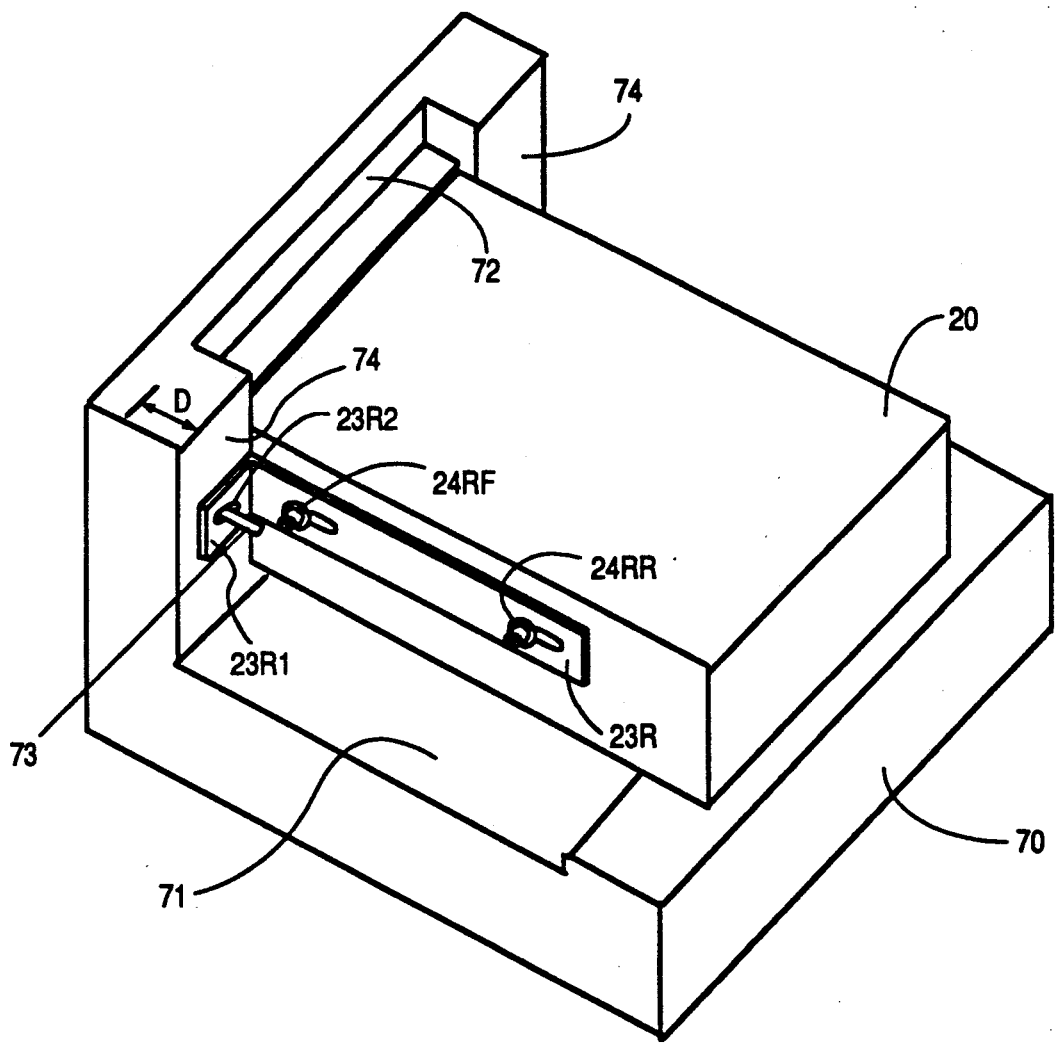
FIG. 7 illustrates the fixture used in aligning the side brackets on third-high drives.

A mounting fixture 70 illustrated in FIG. 7 is useful in positioning the side brackets on third-high disk drives. Mounting fixture 70 has a floor 71 and a recess 72 which has a width W approximately equal to the width of the disk drive. Two pins 73 extend from faces 74 on either side of recess 72. Third-high disk drive 20 is placed into the fixture upside down, with its front fitted firmly into recess 72. Slot 23R2 in wing 23R1 of bracket 23R is fitted over pin 73, and the mounting screws 24RF and 24RR for bracket 23R are tightened. This assures that bracket 23R is positioned at the correct uniform distance from the top of disk drive 20 and that wing 23R1 is positioned a correct horizontal distance D from the front face of disk drive 20.

Figure 8A:
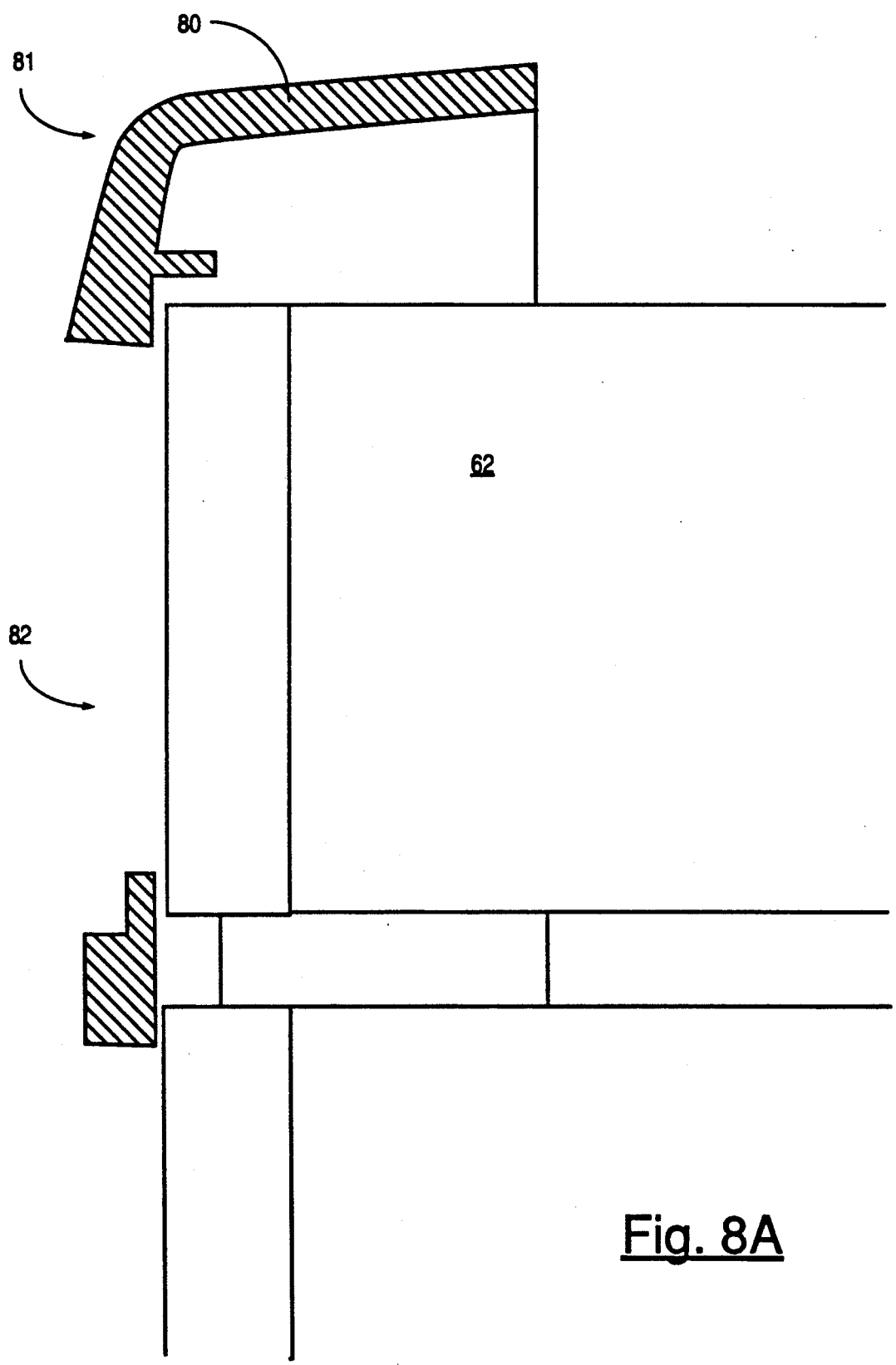
FIGS. 8A and 8B are detailed views showing the positions of 25.4 mm and 28 mm drives, as mounted.
Figure 8B:
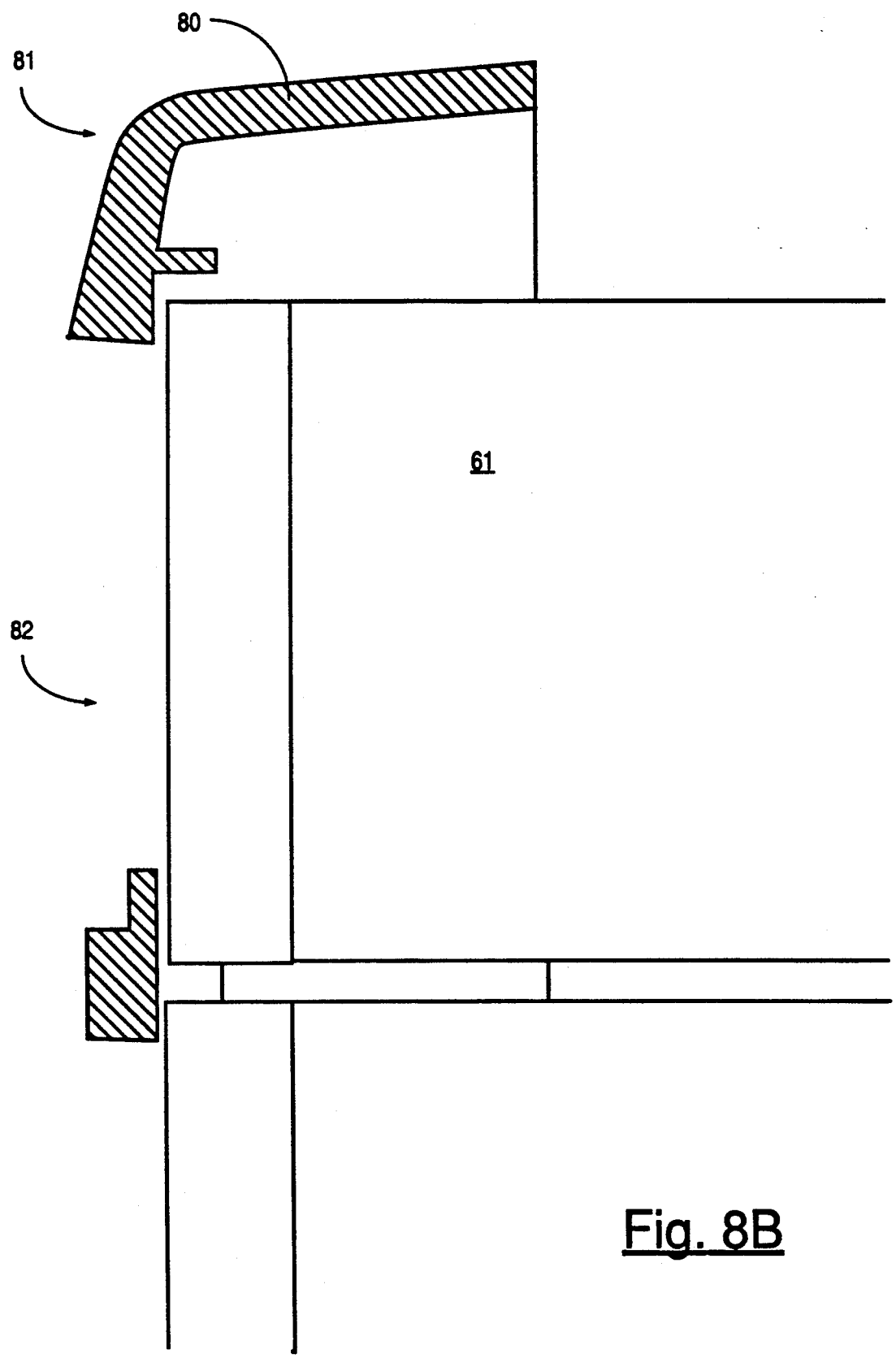

FIGS. 8A and 8B illustrate the position of 25.4 mm drive 62 and 28 mm drive 61, respectively, in relation to the front bezel 80 of a computer 81. Bezel 80 has an aperture 82 which is slightly narrower than the face of either drive 61 or drive 62. It will be noted, however, that the bottom of drive 61 overlaps with bezel 80 more than drive 62.

Figure 5C:
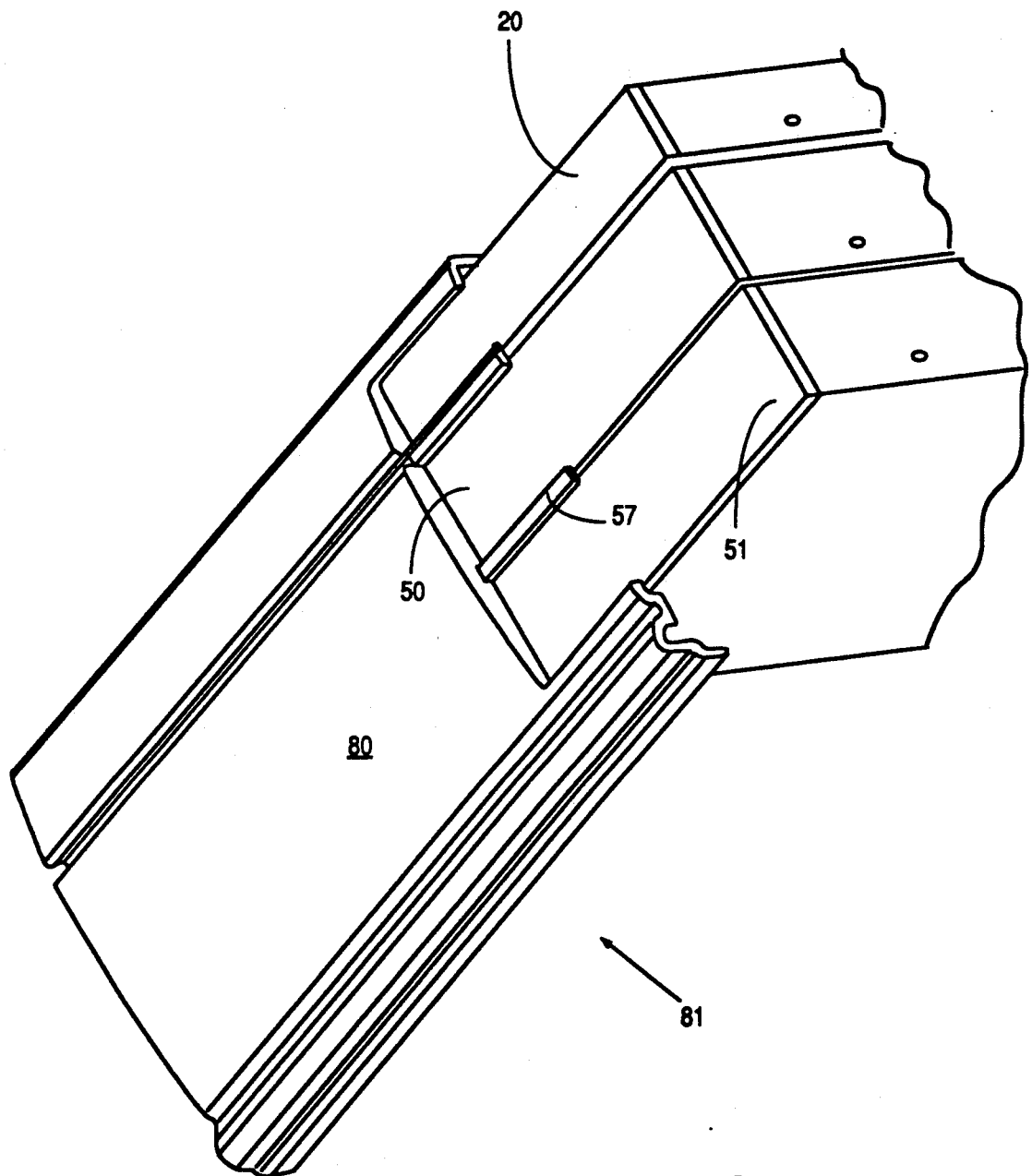
FIG. 5C is a perspective view of the structure illustrated in FIG. 5A.

Referring again to FIG. 5A, computer bezel 53 is shown covering the front bezels 54, 55 and 56 of disk drives 20, 50 and 51, respectively. If half-high drives 50 and 51 are replaced by a full-high drive, horizontal strip 57 of bezel 53 is removed. The structure of FIG. 5A is shown in perspective in FIG. 5C.

The foregoing disclosure is intended to be illustrative and not limiting. Numerous other embodiments will be apparent to those skilled in the art all of which are intended to be within the full scope of this invention.

I claim:

1. A drive dock, said drive dock having two side walls and comprising:
    at least one disk drive having two sides and having a first mounting hole and a second mounting hole tapped into each of said sides;
    two mounting plates attached to said side walls, respectively, of said drive dock, each of said mounting plates comprising a track for mounting a disk drive, said track in each mounting plate comprising an upper ridge and a lower ridge and having a central section and an end section, said upper and lower ridges being spaced by a distance D in said central section, said upper and lower ridges being spaced by a distance greater than said distance D in said end section;
    a first screw and a second screw threaded into said first mounting hole and said second mounting hole, respectively, on each side of said disk drive, each of said first and second screws having a head, said disk drive being mounted in said drive dock with the head of said first screw on each side of said disk drive resting on the lower ridge in the central section of the track of one of said plates so as to support said disk drive.

2. The drive dock of claim 1 comprising two brackets, said brackets being attached to the sides of said disk drive, respectively, by means of said first and second screws, each of said brackets comprising a means of attaching said bracket to a front of said drive dock.

3. The drive dock of claim 2 wherein the front of said drive dock comprises a flange having a threaded stud extending therefrom, said means of attaching said bracket comprising a hole for receiving said threaded stud.

4. The drive dock of claim 1 comprising means of attaching said mounting plates to said side walls, said means of attaching said mounting plates comprising a plurality of hooks in said side walls and a plurality of windows in said mounting plates which are configured so as to cooperate with respective hooks in said side walls.

5. A plate for mounting a disk drive in a drive dock, said plate comprising:
    a first track which extends in a horizontal direction when said plate is mounted on a drive dock, said first track comprising an upper ridge and a lower ridge and being configured so as to receive between said upper and lower ridges a head of a screw threaded into a disk drive;
    said first track comprising a central section and an end section, said upper and lower ridges being substantially parallel to each other and being spaced by a distance D in said central section, said upper and lower ridges being substantially parallel to each other and being spaced by a distance greater than said distance D in said end section.

6. The plate of claim 5, comprising in addition a second track, said first track being for mounting a third-high disk drive, said second track being for mounting a full-high disk drive, said first track and said second track being spaced such that said third-high disk drive and said full-high disk drive are positioned adjacent each other when mounted in said first track and said second track, respectively.

7. The plate of claim 6 wherein said first tack is spaced approximately 2.948 inches from said second track.

8. The plate of claim 5, said plate comprising a plastic.

9. The plate of claim 5 comprising means for attaching said plate to a side wall of a drive dock.

10. The plate of claim 9 wherein said means comprises a plurality of windows for cooperation with a plurality of hooks on a side wall of a disk drive.

11. The plate of claim 9 comprising means for vertically positioning said plate when attached to a side wall of a disk drive.

12. The plate of claim 11 wherein said means for vertically positioning comprises a ridge formed on said plate, said ridge being designed to fit in a slot in a side wall of a disk drive.

13. The plate of claim 9 comprising means for locking said plate in position when it is attached to a side wall of a disk drive.

14. The plate of claim 13 wherein said means for locking comprises an engagement structure formed on a resilient tab formed in said plate, said engagement structure being designed to cooperate with a complementary structure in a side wall of a disk drive.

15. The plate of claim 14 wherein said engagement structure comprises a hemispherical protuberance.

16. The plate of claim 5 comprising in addition a second track and a third track, said second track and said third track each being for mounting a half-high disk drive, said first, second and third tracks being spaced from each other such that when a third-high disk drive is mounted in said first track, a half-high disk drive is mounted in said second track, and a half-high disk drive is mounted in said third track, said third-high disk drive is positioned adjacent one of said half-high disk drives and said half-high disk drives are positioned adjacent each other.

17. The plate of claim 16 wherein said second track is spaced approximately 1.701 inches from said first track and said third track is spaced approximately 1.687 inches from said second track.

18. The plate of claim 16 comprising in addition a fourth track for holding a full-high disk drive, said first track and said fourth track being spaced such that when a third-high disk drive is mounted in said first track and a full-high disk drive is mounted in said fourth track, said third-high disk drive and said full-high disk drive are positioned adjacent each other.

19. The plate of claim 18 wherein said second track is spaced approximately 1.701 from said first track, said fourth track is spaced approximately 1.247 inches from said second track, and said third track is spaced approximately 0.44 inches from said fourth track.

20. A computer comprising a drive dock for mounting a disk drive, said drive dock having two side walls and comprising:
   at least one disk drive having two sides and having a first mounting hole and a second mounting hole tapped into each of said sides;
   two mounting plates attached to said side walls, respectively, of said drive dock, each of said mounting plates comprising a track for mounting a disk drive, said track in each mounting plate comprising an upper ridge and a lower ridge and having a central section and an end section, said upper and lower ridges being spaced by a distance D in said central section, said upper and lower ridges being spaced by a distance greater than said distance D in said end section;
   a first screw and a second screw threaded into said first mounting hole and said second mounting hole, respectively, on each side of said disk drive, each of said first and second screws having ahead, said disk drive being mounted in said drive dock with the head of said first screw on each side of said disk drive resting on the lower ridge in the central section of the track of one of said plates so as to support said disk drive.

* * * * *